US012808738B2

(12) United States Patent
Van Thienen et al.

(10) Patent No.: US 12,808,738 B2
(45) Date of Patent: Nov. 24, 2026

(54) SEALED SENSOR DEVICE AND METHOD OF MANUFACTURE THEREOF

(71) Applicant: Melexis Technologies NV, Tessenderlo (BE)

(72) Inventors: Jietse Van Thienen, Tessenderlo (BE); Carl Van Buggenhout, Ypres (BE); Stijn Reekmans, Tessenderlo (BE)

(73) Assignee: Melexis Technologies NV, Tessenderlo (BE)

( * ) Notice: Subject to any disclaimer, the term of this patent is extended or adjusted under 35 U.S.C. 154(b) by 280 days.

(21) Appl. No.: 18/592,437

(22) Filed: Feb. 29, 2024

(65) Prior Publication Data

US 2024/0295443 A1 Sep. 5, 2024

(30) Foreign Application Priority Data

Mar. 3, 2023 (EP) .................................... 23159942

(51) Int. Cl.
*G01L 19/00* (2006.01)

(52) U.S. Cl.
CPC ...... *G01L 19/0092* (2013.01); *G01L 19/0046* (2013.01)

(58) Field of Classification Search
None
See application file for complete search history.

(56) References Cited

U.S. PATENT DOCUMENTS 6,163,061 A * 12/2000 Iida ......................... H10F 30/22 257/E31.093
2006/0131501 A1* 6/2006 Ikushima ................ G01J 5/024 250/338.1
2016/0149105 A1* 5/2016 Van Buggenhout ...... G01J 5/06 257/429

OTHER PUBLICATIONS

Van Herwaarden et al. "Double-beam integrated thermal vacuum sensor", J. Vac. Sci. Technol. A 5, pp. 2454-2457, 1987. (Year: 1987).*
European Search Report for Application No. EP23159942 dated Aug. 3, 2023.
Van Herwaarden et al. "Double-beam integrated thermal vacuum sensor", J. Vac. Sci. Technol. A 5, pp. 2454-2457, 1987.

* cited by examiner

*Primary Examiner* — Eric S. McCall
*Assistant Examiner* — Nigel H Plumb
(74) *Attorney, Agent, or Firm* — Bracewell LLP; Keith R. Derrington

(57) ABSTRACT

A sealed sensor device comprising: an internal atmosphere comprising a gas pressurised to a predetermined pressure, the predetermined pressure being below atmospheric pressure when the internal atmosphere is hermetically sealed from ambient. A sensor cavity is also provided having a periphery and is in fluid communication with the internal atmosphere, thereby comprising the gas and the gas having a mean free path at the predetermined pressure associated therewith. A thermopile is disposed in the sensor cavity for detecting a change in pressure of the internal atmosphere and detecting failure of the hermetic seal. A membrane structure disposed within the cavity comprises the thermopile. The membrane structure also comprises a heating element, and a shortest distance from substantially any point on the membrane structure to the periphery of the sensor cavity is less than the mean free path of the gas at the predetermined pressure.

14 Claims, 4 Drawing Sheets

SEALED SENSOR DEVICE AND METHOD OF MANUFACTURE THEREOF

FIELD

The present invention relates to a sealed sensor device of the type that, for example, comprises a hermetic seal to contain an internal atmosphere at a predetermined pressure. The present invention also relates to a method of manufacturing a sealed sensor device, the method being of the type that, for example, hermetically seals the device and backfills an internal atmosphere of the device with a gas to a predetermined pressure.

BACKGROUND

In the field of thermal sensors, it is known to employ thermal sensor devices to measure temperatures and/or provide images of remote objects in a scene from light emitted from a target object in the infrared range of the electromagnetic spectrum. A thermal sensor device typically comprises an array, for example arranged as a grid, of sensor pixels, each individually responsive to infrared electromagnetic radiation. In other applications, a single sensing element or pixel is employed.

For such sensor devices, it is desirable to optimise temperature resolution and temperature parameters in order to optimise performance of the devices. A known sensor device comprises a membrane suspended over a cavity by beams extending between a bulk substrate material and the membrane. The membrane carries a thermopile thereon, the hot ends of the thermocouples forming the thermopile being disposed on the membrane and the cold ends of the thermocouples being located where the beams meet the bulk substrate material.

For such sensor devices, two mechanisms predominantly affect performance: so-called "out-gassing" and "out-diffusion". In silicon used to form a sensor device, nitrogen and hydrogen molecules are "trapped" (covalently bonded) within the lattice structure of the silicon. When complementary parts of the sensor are bonded together, for example two separate wafers comprising two parts of the device or devices, and thermally bonded, the thermal bonding process typically results in the trapped nitrogen and hydrogen molecules being released into the cavity of the device during heating of the wafers. This is known as out-gassing. The release of these molecules results in an increase in the internal pressure in the cavity, and the thermal conductivity of the hydrogen molecules, particularly, modifies the thermal response of the sensor device. Additionally, hydrogen and nitrogen molecules present in the cavity can also escape from the cavity (out-diffusion) throughout the lifetime of the device. Such decrease (drift) in pressure within the cavity can also lead to changes in the thermal response of the device.

The devices are typically hermetically sealed. However, failure of such hermetic seals leads to degradation in the performance of the sensor devices. In the presence of the above-mentioned release of gas molecules, failure of a device seal can be relatively easily detected, because for every additional millibar of hydrogen released, there is about a 0.1% reduction in responsivity of the sensor device. Therefore, for a change in pressure of about 5 mbar of hydrogen, a reduction in responsivity of 0.5% results, which is detectable and differentiates a perfectly sealed device from a device with an imperfect hermetic seal.

An improved device has been developed that comprises a getter and is backfilled to a predetermined pressure. The use of the getter obviates or at least mitigates the effects of the mechanisms by which gas is released and changes to the internal pressure of the cavity of the device. As such, the pressure within the sensor device remains relatively stable and does not change significantly as a result of heating during the manufacturing process. However, in the absence of a predictable increase in internal pressure during manufacture, it is not possible to detect imperfect seals in such devices.

It is possible to screen for devices with failed seals by testing the devices inside a vacuum chamber. In this regard, a properly sealed device should exhibit very little or no drift in responsivity and so where a leak exists the device exhibits significant responsivity drift as a result of a vacuum forming within the device and thus the pressure in the cavity changing. However, this testing technique has two disadvantages: a financial cost is attached to testing in a vacuum chamber, because it is an additional non-standard test, and it is not possible to detect imperfect seals when the device has left the semiconductor fabrication plant and is in the hands of a customer.

Comparing responsivity of a device before and after a wafer dicing stage, i.e. the drift in responsivity exhibited between probing and final test stages, can be used to detect some devices on the wafer with faulty seals. However, such a technique places additional constraints on the testing procedure for the sensor devices, namely some temperature conditions must be re-measured between probing and final test stages, attracting an increase in manufacturing cost. Also, devices with failed seals ab initio in the production process are less likely to exhibit any additional drift in responsivity at the final test stage and so will go undetected.

Lastly, if sensor devices were to be manufactured by forming so-called "deep" vacuums therein as part of the manufacturing process, it is possible to detect devices possessing failed seals by way of analysing the responsivity of the devices. However, the use of deep vacuums is incompatible with glass-frit wafer bonding techniques, which is a desirable technique to employ during manufacture. Additionally, a device comprising a deep vacuum therein is more vulnerable to responsivity drift, and a partial gas pressure can develop over the lifetime of the device as a result of the out-gassing mechanism described above. As such, the effect on the responsivity of the device will be more pronounced than for a device backfilled with a gas under pressure.

SUMMARY

According to a first aspect of the present invention, there is provided a sealed sensor device comprising: an internal atmosphere comprising a gas pressurised to a predetermined pressure, the predetermined pressure being below atmospheric pressure when the internal atmosphere is hermetically sealed from ambient; a sensor cavity having a periphery and in fluid communication with the internal atmosphere, thereby comprising the gas and the gas having a mean free path at the predetermined pressure associated therewith; a thermopile disposed in the sensor cavity for detecting a change in pressure of the internal atmosphere and detecting failure of the hermetic seal; a membrane structure disposed within the sensor cavity and comprising the thermopile; wherein the membrane structure also comprises a heating element; and a shortest distance from substantially any point on the membrane structure to the periphery of the sensor cavity is less than the mean free path of the gas at the predetermined pressure.

The device may further comprise: a sensor pixel in fluid communication with the internal atmosphere and substantially insensitive to the pressure of the internal atmosphere.

The sensor pixel may comprise: a sensor cavity; the sensor cavity may comprise a getter material disposed therein.

The thermopile may be blind to infrared radiation external to the cavity.

The sensor pixel may be an infrared sensor pixel comprising a measurement cavity; a measurement membrane and a measurement thermopile may be disposed on the measurement membrane.

The sensor pixel may further comprise a measurement heater element; the measurement heater element may be configured to provide a heat output matched to a heat output of the heater element.

The device may further comprise: a blind measurement pixel; the blind measurement pixel may be in fluid communication with the internal atmosphere and disposed adjacent the sensor pixel.

The thermopile, the membrane and the cavity may constitute a pressure sensor pixel; the pressure sensor pixel may have a responsivity associated therewith that may be dominated by a thermal conductance of the gas.

The device may further comprise: a measurement circuit operably coupled to the thermopile; wherein the measurement circuit may be configured to calculate a first responsivity in respect of the internal atmosphere.

The measurement circuit may be operably coupled to the measurement thermopile and configured to calculate a second responsivity in respect of the internal atmosphere and to calculate a relative responsivity using the first and second responsivities.

According to a second aspect of the present invention, there is provided a sealed sensor array comprising a plurality of measurement sensor pixels and the sealed sensor device as set forth above in relation to the first aspect of the present invention.

The plurality of measurement pixels may be in fluid communication with the internal atmosphere.

According to a third aspect of the present invention, there is provided a method of detecting failure of a hermetic seal of a sealed pressure sensor device, the method comprising: providing the pressure sensor device as set forth above in relation to a first aspect of the present invention; measuring a responsivity of the pressure sensor device; and determining whether the pressure of the internal atmosphere has increased and caused the responsivity to fall below a predetermined expected responsivity value.

According to a fourth aspect of the present invention, there is provided a method of manufacturing a sealed pressure sensor device, the method comprising: forming a sensor cavity having a periphery; forming a membrane structure comprising a thermopile within the cavity; forming a heating element adjacent a hot end of the thermopile structure; backfilling the sealed pressure sensor device with a gas to a predetermined pressure below atmospheric pressure and hermetically sealing the pressure sensor device, thereby providing an internal atmosphere; wherein the sensor cavity is in fluid communication with the internal atmosphere, thereby comprising the gas and the gas having a mean free path at the predetermined pressure associated therewith; and a shortest distance from substantially any point on the membrane to the periphery of the cavity is less than the mean free path of the gas at the predetermined pressure.

It is thus possible to provide a sealed sensor device and a method of manufacture thereof that permits the detection of imperfect hermetic seals both during manufacture of the sensor device and during use in the field over the lifetime of the device. The device and method benefit from the use of the same manufacturing processes for forming thermopile infrared sensors, including materials, and so the Bill-of-Process for the device and method is unchanged. As such, the cost of processing during manufacture does not increase. Furthermore, additional risk of device failure associated with forming the device with an additional cavity for an additional sensor element is very low, because modification to the recipe for the manufacturing process for the infrared sensor is not required. The apparatus and method further enable the use of relative responsivity measurement if desired for improved accuracy in detection of failed seals.

BRIEF DESCRIPTION OF THE DRAWINGS

At least one embodiment of the invention will now be described, by way of example only, with reference to the accompanying drawings, in which.

DETAILED DESCRIPTION OF THE EXAMPLE EMBODIMENTS

Figure 1:
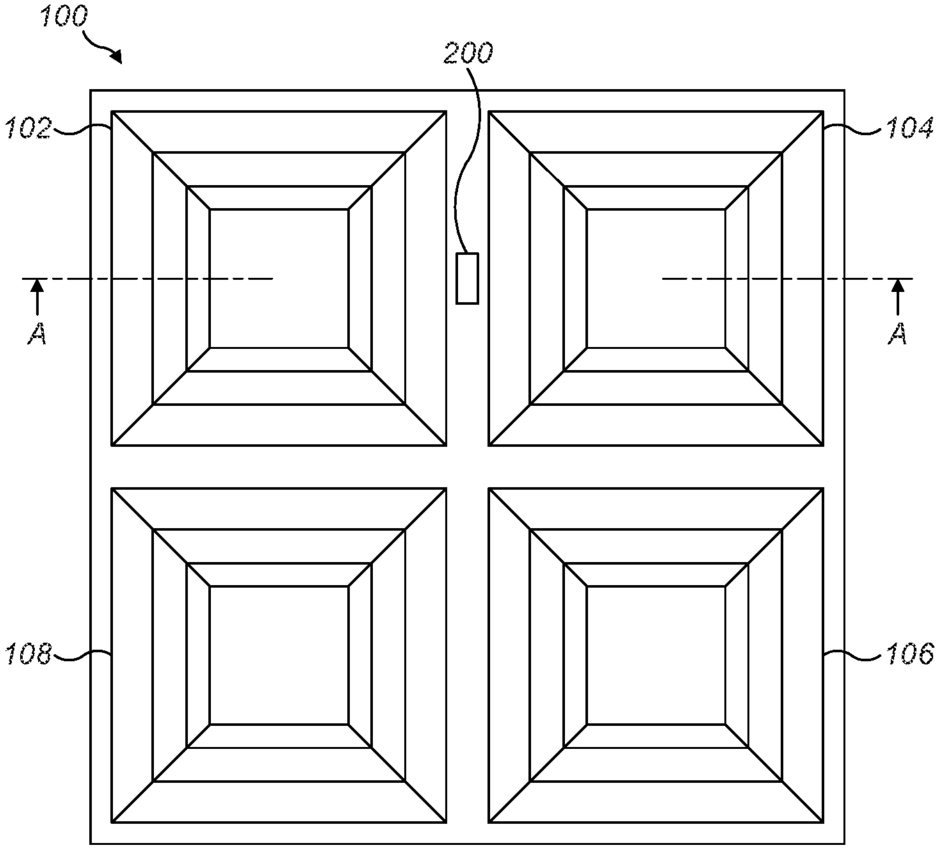
FIG. 1 is a schematic diagram of a cluster of thermal sensor elements of the thermal sensor device.

Throughout the following description, identical reference numerals will be used to identify like parts. The terms "thermal sensor element" and "thermal sensor pixel" will be used interchangeably throughout.

Referring to FIG. 1, a thermal sensor device 100 comprises, in this example, a first thermal sensor element 102, a second thermal sensor element 104, a third thermal sensor element 106 and a fourth thermal sensor element 108. The first, second, third and fourth thermal sensor elements 102, 104, 106, 108 are of a like construction.

The first, second, third and fourth thermal sensor elements 102, 104, 106, 108 are arranged as a cluster of neighbouring windowed and windowless thermal sensing elements, known as "live" and "blind" pixels, respectively. The live pixels comprise apertures in cap portions thereof to receive infrared radiation emitted by objects in a scene and constitute measurement sensor pixels, whereas blind pixels intentionally do not possess such apertures and are used, for example, for reference purposes.

In this example, the first and third thermal sensor elements 102, 106 are configured as live pixels, and the second and fourth thermal sensor elements 104, 108 are configured as blind pixels. The live pixels are disposed adjacent the blind pixels. A fifth sensor element 200 is formed in a substrate portion of the cluster of neighbouring windowed and windowless thermal sensing elements. The fifth sensor element 200 is a pressure sensor formed using in a like manner to the first, second, third and fourth thermal sensor elements 102, 104, 106, 108 and is effectively a fifth thermal sensor element configured to be sensitive to pressure and thus constitutes a pressure sensor pixel. In this regard, the responsivity associated with the fifth sensor element 200 is dominated by a thermal conductance of a gas. The manner in which this is achieved will be described later herein.

Figure 2:
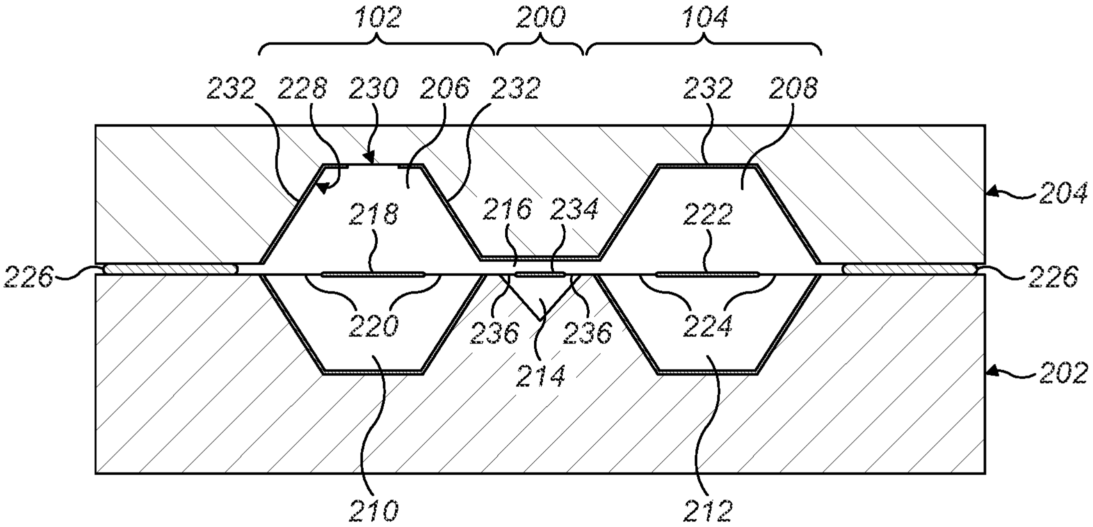
FIG. 2 is a cross-sectional schematic diagram of the cluster of thermal sensor elements of FIG. 1 through line A-A.

The first, second, third, fourth and fifth thermal sensor elements 102, 104, 106, 108, 200 (FIG. 2) are formed as a bonded bi-wafer structure comprising a substrate portion 202 and a cap portion 204, the cap portion 204 being attached to the substrate portion 202 by a glass frit bonding process in this example. However, the skilled person will appreciate that other bonding techniques can be employed in order to attach the cap portion 204 to the substrate portion 202. In the context of the first, second and fifth thermal sensor elements 102, 104, 200, the cap portion 204 constitutes a first part of a body of the thermal sensor elements and comprises a first recess 206 and a second recess 208 in respect of the exposed (live) first thermal sensor element 102 and the blind thermal sensor element 104, respectively. The first recess 206 defines a first part of a first chamber and the second recess 208 defines a first part of a second chamber, both of which will be described later herein. The substrate portion 202 comprises a third recess 210 and a fourth recess 212, respectively corresponding to the exposed (live) thermal sensor element 102 and the blind thermal sensor element 104. The third recess 210 defines a second part of the first chamber and the fourth recess 212 defines a second part of the second chamber. The cap portion 204 and the substrate portion 202 are sandwiched together so that the first and third recesses 206, 210 and the second and fourth recesses 208, 212 are respectively in registry. Between the exposed and blind thermal sensor elements 102, 104, the substrate portion 202 comprises a fifth recess 214 defining a third chamber of the fifth sensor element 200 and constituting a sensor cavity. Between the exposed and blind thermal sensor elements 102, 104, the cap portion 204 is profiled so as to define a passageway 216 between the first and second chambers that passes over the fifth recess 214 so that the first and second chambers and the fifth recess 214, which serves as a third chamber, are in fluid communication with each other. Although not shown, the passageway 216 also extends to third and fourth chambers of the third and fourth thermal sensor elements 106, 108 and is in fluid communication with the third and fourth chambers. When the substrate portion 202 is bonded to the cap portion 204, the bonded bi-wafer structure formed is backfilled with, for example, an inert gas, such as nitrogen, under a predetermined pressure. The cluster of the first, second, third, fourth and fifth sensor devices 102, 104, 106, 108, 200 thus comprises a hermetically sealed local environment, constituting an internal atmosphere, shared by the first, second, third, fourth and fifth sensor elements 102, 104, 106, 108, 200. In this example, the pressure of the backfilled gas is less than atmospheric pressure when the internal atmosphere is hermetically sealed from ambient. Whilst the fifth sensor element 200 is sensitive to pressure variations, the first, second, third and fourth thermal sensor elements 102, 104, 106, 108, which are live and blind pixels, are substantially insensitive to the pressure of the internal atmosphere.

The substrate portion 202 comprises a first thermal sensing structure, for example a first thermopile sensor structure, formed on a first thermally conductive membrane 218 suspended over the third recess 210 by a first set of two or more beams 220. However, more generally, the first thermally conductive membrane can comprise the first thermopile sensor structure. Indeed, in some examples, the thermopile structure can also serve as the membrane. The substrate portion 202 also comprises a second thermal sensing structure, for example a second thermopile sensor structure, formed in a second thermally conductive membrane 222 suspended over the fourth recess 212 by a second set of two or more beams 224. However, more generally and as stated above in relation to the first thermally conductive membrane, the second thermally conductive membrane can comprise the second thermopile sensor structure. Indeed, in some examples, the thermopile structure can also serve as the membrane.

The substrate portion 202 further comprises a third thermal sensing structure configured to be sensitive to the pressure of the local environment; the local environment is expected to be hermetically sealed, but is sometimes not sealed owing to failures during manufacture that can occur. In this example, the third thermal sensing structure of the fifth sensor element 200 is formed by employing the same device process technique (and order of steps) as employed to form the first, second, third and fourth thermal sensor elements 102, 104, 106, 108, but differs in the dimensions of the structural features of the fifth thermal sensor element 200, details of which will be described later below. The first thermal sensor element 102, and indeed the third thermal sensor element 106, are infrared sensor pixels respectively comprising a measurement cavity, a measurement membrane and a measurement thermopile of the measurement membrane.

As mentioned above, the cap portion 204 and the substrate portion 202 are held together by a surrounding layer of glass 226 that has been melted between opposing faces of the cap portion 204 and the substrate portion 202 using the glass frit bonding technique.

During manufacture, any suitable "bulk" material is provided as the substrate portion 202, for example silicon. The third, fourth and fifth recesses 210, 212, 214 are formed by etching, the recesses 210, 212, 214 tapering inwardly with depth of etching, thereby yielding an etched layer of bulk material. The first and second thermally conductive membranes 218, 222 are relatively thin shaped structures, also known as diaphragms, formed over the bulk material from, for example field oxide, and connected to the substrate portion 202 by the beams 220, 224, which are also known as webs and also formed from field oxide. The beams 220, 224 respectively constitute narrow track portions that extend from a region of the substrate portion 202, associated with the first and second thermal sensor element 102, 104, to the first and second membranes 218, 222. In this example, the narrow track portions extend from two opposite sides of the respective regions of the substrate portion 202 associated with the first and second thermal sensor elements 102, 104 and meet the first and second membranes 218, 222 at opposite sides thereof. Likewise, a third thermally conductive membrane 234, which is also a relatively thin shaped structure formed over the bulk material from, for example field oxide, is connected to the substrate portion 202 by beams 236 and also formed from field oxide. The beams 236 are also narrow track portions that extend from a region of the substrate portion 202, associated with the fifth thermal sensor element 200, to the third membrane 234. As described above, portions of the substrate portion 202 are removed, for example by any suitable known etching technique, so as form the first and second membranes 218, 222 and the beams 220, 224 and the third and fourth recesses 210, 212 respectively beneath the first and second membranes 218, 222 and the beams 220, 224. Likewise, and during at least a portion of this same time, a portion of the substrate portion 202 in respect of the fifth sensor element 200 is removed using the same known etching technique so as form the third membrane 234, the beams 236 and the fifth recesses 214 beneath the third membrane 234 and the beams 236.

The cap portion 204 is formed by providing a layer of light-transmissive bulk material in respect of the infrared region of the electromagnetic spectrum, for example silicon. The layer of bulk material is then patterned and etched using any suitable lithographic technique in order to form the first recess 206 and the second recess 208, the first and second recesses 204, 208 tapering inwardly with depth of etching, thereby yielding an etched layer of bulk material. A layer of getter material 232 is then deposited over the etched layer of bulk material. Thereafter, an inner surface 228 of the getter material 232 covering the etched layer of bulk material is patterned with photoresist to define a window 230 in the getter material 232, substantially centrally at the deepest part of the etch in respect of the first recess 206. The window 230 is then etched in accordance with any suitable lithographic etching technique and the photoresist defining the window 230 is then removed to leave the completed cap portion 204. Although the layer of bulk material is light transmissive other materials that are less light transmissive can be employed and the window 230 can be formed in the layer of bulk material, for example by etching.

The cap potion 204 is then bonded to the substrate potion 202 so that the first and second membranes 218, 222 and the beams 220, 224 are encapsulated within a closed environment that is usually hermetically sealed. The internal atmosphere is formed by backfilling with gas at the predetermined pressure, the local environment being formed by bonding the cap portion 204 to the substrate portion 202. In this example, the predetermined pressure is below atmospheric pressure The pressure within the cavity, and the gas composition inside the cavity, are largely determined by the specific technique employed to seal the substrate portion 202 to the cap portion 204. Most of the cap portion 204 is covered by a layer of non-transparent material, except for an opening to serve as the window or aperture through which infrared electromagnetic radiation is permitted to propagate.

Figure 3:
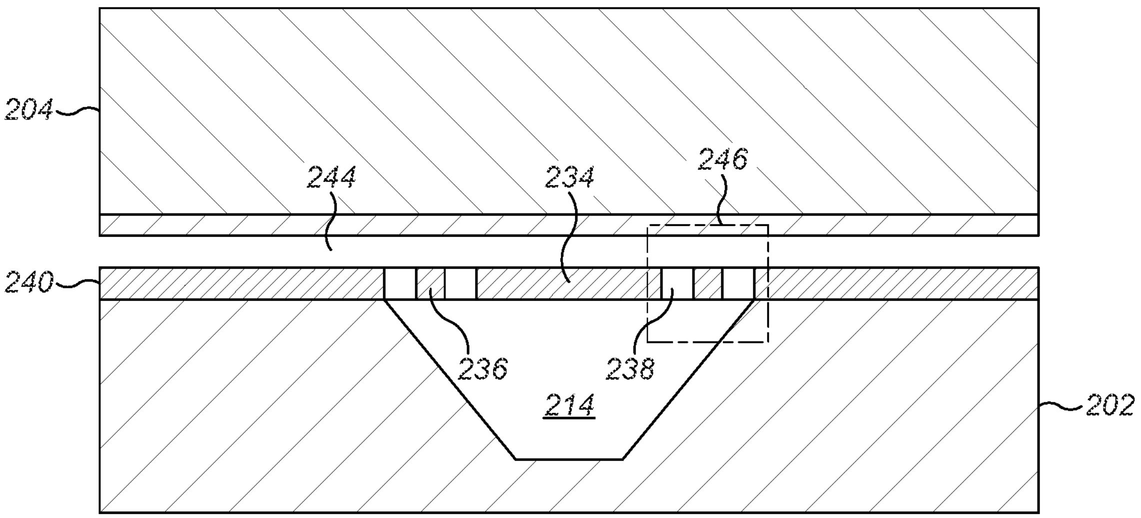
FIG. 3 is a cross-sectional schematic diagram of a pressure sensing element of the FIG. 2 in greater detail.
Figure 4:
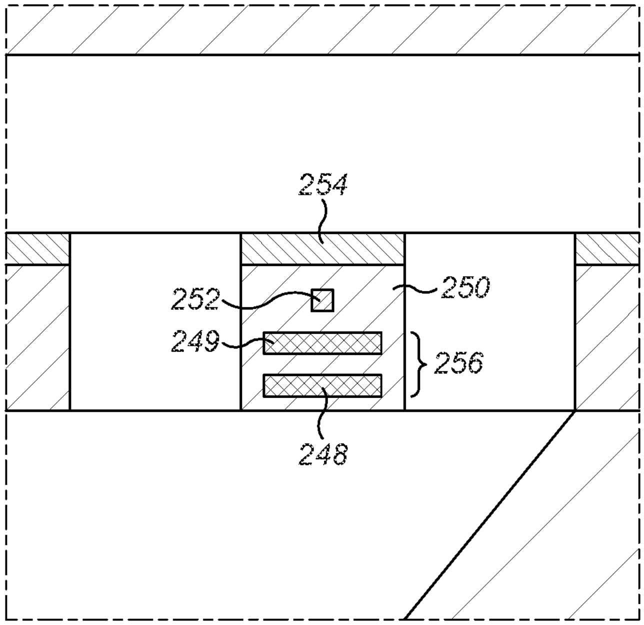
FIG. 4 is a cross-sectional schematic diagram of a part of the pressure sensing element of FIG. 3 in greater detail.
Figure 5:
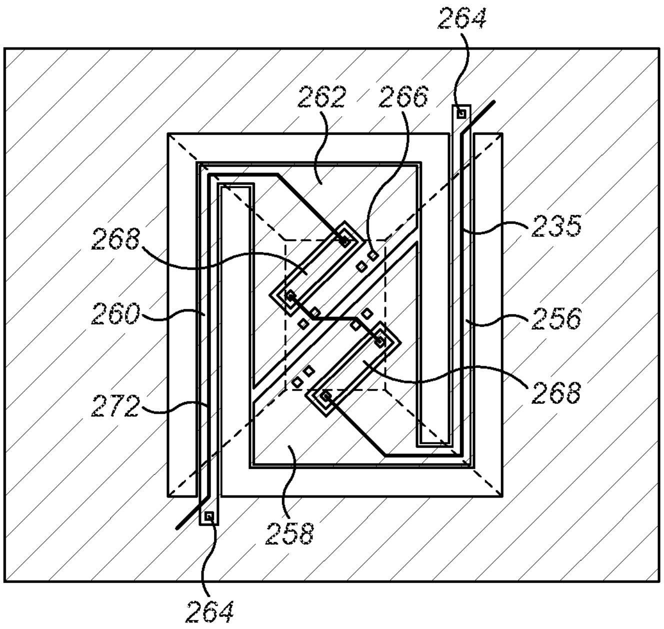
FIG. 5 is a plan view of the pressure sensing element of FIG. 2.

Turning to FIGS. 3, 4 and 5, the fifth thermal sensor element 200 comprises, as described above, the fifth recess 214 formed in the substrate portion 202. As a consequence of the passageway 216, for example, the fifth recess 214 is in fluid communication with the internal atmosphere and therefore the fifth recess 214 comprises the backfilled gas mentioned above. The third membrane 234 is suspended above the fifth recess 214 by the beams 236 spaced from the third membrane 234 by slits 238 either side of the beams 236. The substrate portion 202 is separated from the cap portion 204 by a so called Back End Of Line (BEOL) stack 240 and the passageway 216. This creates a cavity space 244 above the third membrane 234, which is shallower than the fifth recess 214.

Referring to FIG. 4 particularly, where the portion of the fifth thermal sensor element 200 bounded by the broken-line rectangle 246 is shown, one of the beams 236 comprises a first layer of polysilicon 248 embedded in a silicon dioxide layer 250 above a second layer of polysilicon 249 in spaced relation. A thin line of routing metallisation 252 is also embedded within the silicon dioxide layer 250 above the second layer of polysilicon 249 and spaced apart from the first and second layers of polysilicon 248, 249. The silicon dioxide layer 250 is capped by a passivation layer 254, for example a layer of silicon nitride. As shown in the plan view of FIG. 5, a thermocouple 256 is formed by polysilicon traces disposed on the beams 236 that are respectively coupled between the bulk of the substrate portion 202 and a respective portion of the third membrane 234. In this regard, n-type polysilicon and p-type polysilicon are provided in a first beam 235 of the beams 236 as the first and second layers of polysilicon 248, 249, respectively, and extends over a first portion 258 of the third membrane 234. However, more generally, the first beam 235 can comprise the n- and p-type polysilicon. Indeed, in some examples, the n- and p-type polysilicon can also serve as the first beam 235. Similarly, n- and p-type polysilicon are provided in a second beam 260 of the beams 236 as the first and second layers of polysilicon 248, 249, respectively, and extends into a second portion 262 of the third membrane 234. However, more generally, the second beam 260 can comprise the n- and p-type polysilicon. Indeed, in some examples, the p-type polysilicon can also serve as the second beam 260. Cold junctions 264 of the thermocouple 256 are located where the first and second beams 256, 260 respectively meet the bulk of the substrate portion 202 and hot ends 266 of the thermocouple 256 are located at opposing ends of the first and second portions 258, 262 of the third membrane 234, the hot ends 266 being electrically connected to each other to form the thermocouple 256. In the present example, the thermocouple comprises n-type and p-type polysilicon disposed in a common plane, the thermocouple 256 constituting a thermopile of a single thermocouple. However, in other example, stacks of n-type and p-type polysilicon can be employed to provide thermopiles of multiple thermocouples. For example, each beam coupled to the third membrane 234 can be arranged to provide two thermocouples, thereby providing a thermopile of four thermocouples.

A heating resistor 268 is formed on the third membrane 234, respectively on the first and second portions 258, 262 thereof. The heating resistor 268 is coupled to a current source by heater routing metallisation 272. The heating resistor 268 forms part of the structure of the third membrane 234. The fifth sensor element 200 is windowless and thus effectively blind to infrared radiation external to the fifth sensor element 200.

Figure 6:
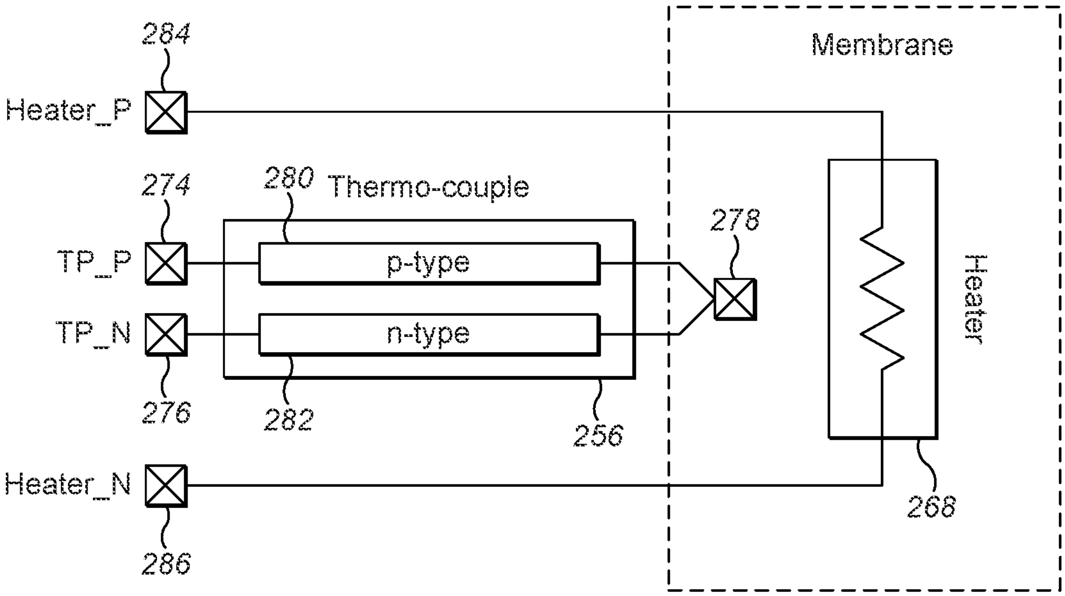
FIG. 6 is an electrical equivalent schematic circuit diagram of the pressure sensing element of FIG. 2.

Turning to FIG. 6, respective positive and negative thermocouple terminals 274, 276 are provided at the cold ends 264 (FIG. 5) of the thermocouple 256 for coupling to a measurement circuit (not shown), connection 278 providing the coupling of the p-type polysilicon 280 to the n-type polysilicon 282 at the hot end 266 of the thermocouple 256. A first terminal of the heating resistor 268 is connected to a heater positive terminal 284 and a second terminal of the heating resistor 268 is connected to a heater negative terminal 286. The heater positive terminal 284 and the heater negative terminal 286 are coupled to the measurement circuit. The thermocouple 256, the third membrane 234 and the cavity 214 constitute the primary component parts of the fifth sensor element 200, which acts as a pressure sensor.

In order to make the fifth sensor element 200 sensitive to pressure, whilst being formed using the same process steps as the first, second, third and fourth thermal sensor elements 102, 104, 106, 108 albeit with different parameters, the formation of the fifth recess 214 has to be limited as compared to the third and fourth cavities 210, 212. In this regard, the backfilled gas, for example nitrogen, is held in the shared environment under pressure and the gas molecules have a mean free path associated with motion of the gas at the predetermined pressure mentioned above, as expressed by a simplified model of a dilute diatomic gas:

$$K = \frac{5}{3}\lambda\frac{P}{T}\sqrt{\frac{2kT}{\pi m}} \quad (1)$$

where conductivity, κ, is defined in terms of the mean free path, λ, temperature of the gas, T, pressure of the gas, P, Boltzman's constant, k, and mass of one molecule of the gas, m.

From this equation, it can be seen that thermal conductivity is dependent upon pressure via the concentration of molecules in the gas, i.e. the thermal carriers.

The mean free path, λ, of the gas at the pressure, P, can be expressed as:

$$\lambda = \frac{kT}{\sqrt{2}\pi d^2 P} \quad (2)$$

where d is the kinetic diameter of the gas molecule. Hence, at the same time as the thermal conductivity is dependent upon the pressure of the gas, the mean-free-path, λ, of these gas molecules is inversely proportional to the pressure of the gas.

This can be seen by substituting equation (2) into equation (1) to give the following expression for conductivity, κ:

$$\kappa = \frac{5}{3}\left(\frac{kT}{\sqrt{2}\pi d^2 P}\right)\frac{P}{T}\sqrt{\frac{2kT}{\pi m}} \quad (3)$$

As can be seen, the terms for pressure, and hence both "mechanisms", cancel each other out. However, this equilibrium only holds when the mean free path of gas molecules is not constrained by any obstacles. In the context of a pressurised pixel cavity, the case of a limited volume applies and so the gas molecules are no longer unconstrained by obstacles. As such, when the dimensions of the cavity are less than what is sometimes called the effective mean free path, $\lambda_{eff}$, the effective mean free path, $\lambda_{eff}$, can be used as one of the dimensions of the cavity in order to obtain improved sensitivity to pressure. For example, a shortest distance from any point on the third membrane 234 to the periphery of the third recess 214 in the bulk material of the substrate portion 202, such as the depth of the cavity can be set to the depth of the effective mean free path, $\lambda_{eff}$. In this regard, the effect of this constraint on conductivity can be seen by substituting the variable for the mean free path, λ, in equation (1) for the shortest distance, I, mentioned above. Under these conditions, the thermal conductivity of the gas remains substantially constant above a predetermined theoretical pressure, P1, and below the predetermined theoretical pressure, P1, the thermal conductivity of the gas molecules decreases with decreasing pressure, the pressure at which decay starts being determined by the dimensions of the cavity. It can also be seen that the predetermined theoretical pressure, P1, increases as the dimension of the cavity reduces further. For the purpose of detecting leaks to establish whether the local environment is still hermetically sealed, it is advantageous to set the dimension of the cavity, for example the distance between the third membrane 234 and the bulk of the substrate portion 202, so that the predetermined theoretical pressure, P1, is slightly above atmospheric pressure. This then makes the fifth thermal sensor element 200 sensitive to a range of pressures, which can be used to detect leaks resulting in the internal pressure of the local environment rising to or around atmospheric pressure.

To ensure that the fifth thermal sensor element 200 is as sensitive to pressure as possible, the dependence of the thermal conductivity of the fifth thermal sensor element 200 on solid materials from which the fifth thermal sensor element 200 is formed should be minimised as much as possible, and so thermal conductance through solid parts, for example the beams 236 needs to be minimised. In this example, the dimensions of the cavity are optionally maintained as small as possible by designing the narrowest (or close thereto) size of the slit 238 allowed by design rules, and by reducing the area of the pixel in order to achieve shallow etching under the third membrane 234 when using a wet etch process. In this example, the slits are arranged, for example a first slit and a second slit as a pair of nested substantially U-shaped slits where an opening of the first slit is facing an opening of the second slit, a predetermined spacing being provided where sides of the first slit are adjacent the second slit to define the first and second beams 235, 260. The sizing, shape, proximity, spacing and/or relative placement of the first and second slits facilitates the shape and depth of the fifth recess 214 and hence the cavity.

Figure 7:
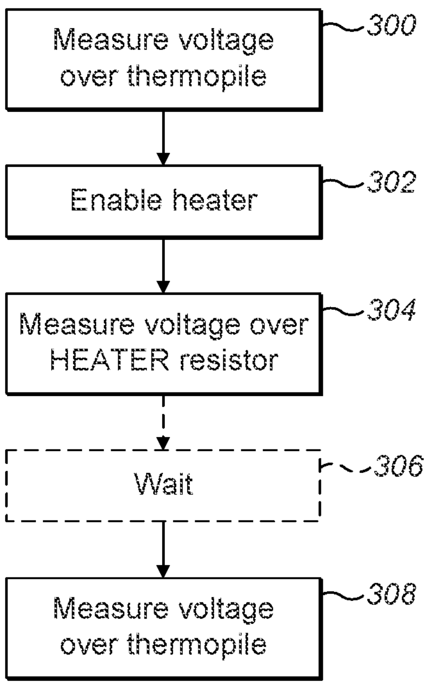
FIG. 7 is a flow diagram of a method of testing responsivity of a gas in an internal atmosphere employing the pressure sensing element of FIG. 2.

Turning to FIG. 7, a pressure test to test for leakage of the internal environment comprises the following steps. Firstly, the voltage across the thermocouple 256 is measured (Step 300) by the measurement circuit, which is in this example operably coupled to the thermocouple 256, when the fifth sensor element 200 is in a state where the heating resistor 268 is not powered. This provides a first measurement voltage, $V_{TP\_disabled}$. Subsequently, the heating resistor 268 is enabled (Step 302) by the measurement circuit 122 and a predetermined current, $I_{heater}$, is allowed to flow through the heating resistor 268, the voltage across the heating resistor 268 being measured (Step 304) by the measurement circuit to obtain the heater voltage, $V_{heater}$. Multiplying the heater current, $I_{heater}$ by the heater voltage $V_{heater}$ yields the heater power, $P_{heater}$. A predetermined period of time is awaited (Step 306) in order to enable the thermal response of the gas in the internal environment to reach a steady temperature, i.e. settle, and then the voltage across the thermocouple 256 is again measured by the measurement circuit in order to obtain a second measurement voltage, $V_{TP\_enabled}$ (Step 308) as a result of the heating of the gas in the internal environment. A net thermopile voltage increase, $V_{TP\_increase}$, can then be calculated by subtracting the second thermocouple measurement, $V_{TP\_disabled}$, from the first thermocouple measurement $V_{TP\_enabled}$.

Using the measurement values and the known value, for example the heater current, $I_{heater}$, it is possible to calculate the responsivity of the gas in the internal atmosphere:

$$\text{Responsivity} = \frac{V_{TP\_increase}}{P_{heater}} = \frac{V_{TP\_increase}}{(V_{heater} \times I_{heater})}$$

The responsivity calculated can then be compared against a known expected range of responsivities for the fifth sensor element 200 under test conditions, and values falling outside the expected range, for example where the responsivity falls below a predetermined responsivity value, being indicative of a leak and hence leak detection. This test is an absolute test and aims to detect changes in pressure of the internal atmosphere and thus failure of the hermetic seal. In this regard, an increase in the pressure within the internal atmosphere is indicative of failure of the hermetic seal to maintain the pressure of the internal atmosphere.

In another embodiment, relative responsivity measurements in respect of the internal atmosphere can be made in order to determine a measure of responsivity to be compared with an expected range of relative responsivities. In one example, a live thermal sensor element, for example the first thermal sensor element 102, is also provided with a heating resistor in order to enable local heating of the live pixel. The heating resistor 268 constitutes a measurement heater element, which is configured to provide a heat output that matches the heat output of the heater element of the fifth sensor element 200 when activated. Relative responsivity, r, is defined as:

$$r = \frac{resp_{IR\_pixel}}{resp_{Press\_pixel}}$$

where $resp_{IR\_pixel}$ is calculated responsivity of the live pixel using the methodology described above in relation to FIG. 7, and $resp_{Press\_pixel}$ is the calculated responsivity of the fifth sensor element 200 expressly provided to be responsive to pressure. For a properly sealed device, this ratio is again within a predetermined expected range. However, where the device cluster is hermetically leaky, this ratio deviates from the expected range. One benefit of employing a relative responsivity measure is that, as compared with an absolute responsivity measure, less variation in responsivity is exhibited owing to variations in process, temperature and gas composition being partially cancelled out. The protocol of the previous example is followed, i.e. an initial measurement is made followed by activation of the heating resistor, waiting and then making a steady state measurement, but instead of absolute responsivity measurements being made, relative responsivity measurements are made.

Figure 8:
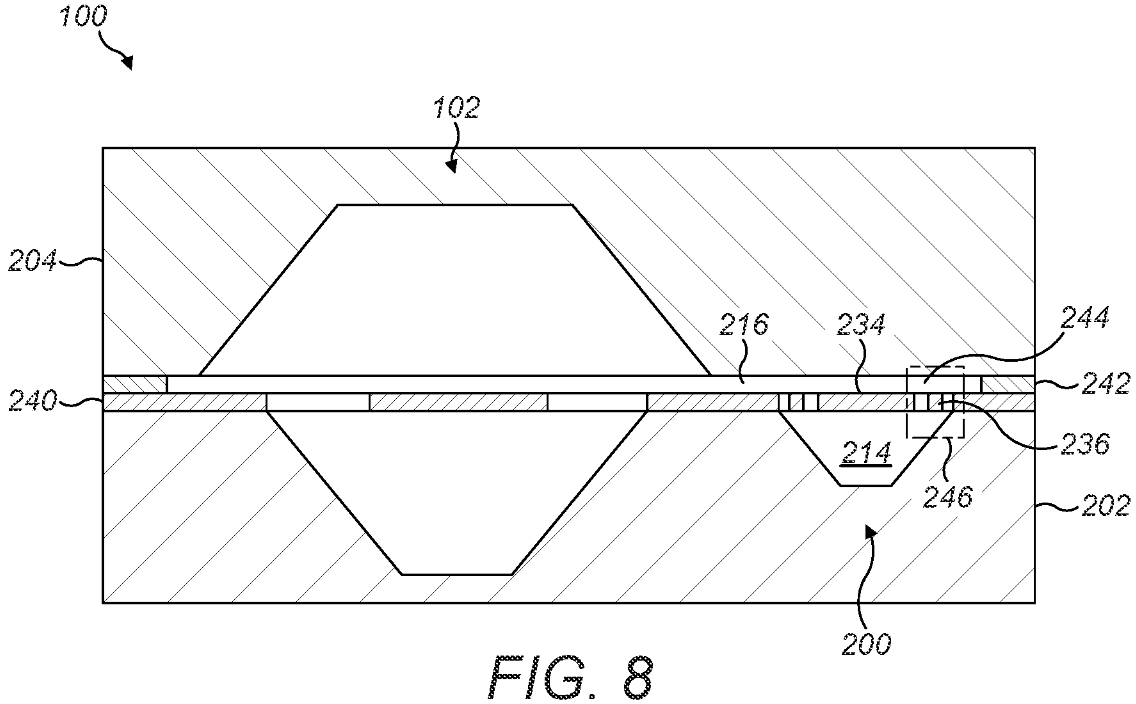
FIG. 8 is a schematic diagram of a single thermal sensor element paired with a single pressure sensor element constituting a further embodiment of the invention.

Although in the above examples a cluster of five sensors is described: the first, second, third and fourth thermal sensor elements 102, 104, 106, 108 and the fifth sensor element 200 sharing a sealed internal atmosphere of back-filled gas under pressure to provide a single sensing unit, it should be appreciated that other configurations of thermal sensor elements are contemplated. For example, instead of providing a cluster of five sensor elements sharing a sealed internal atmosphere, one or more thermal sensor elements can be provided, as a cluster, with a thermal sensor element configured to sense pressure in a shared sealed internal atmosphere. As can be seen in FIG. 8, a single thermal sensor element 102 can be paired with a single pressure sensor element 200.

In another embodiment, multiple clusters, irrespective of the number of sensor elements contained therein, can be arranged as an array of clusters, each cluster having its own sealed internal atmosphere. Alternatively, any number of clusters can share a sealed internal atmosphere, and in such a configuration each cluster need not have a pressure sensor element but rather instead share one or more pressure sensor elements in fluid communication with the sealed internal atmosphere. In this regard, the number of pressure sensor elements can be less than the number of clusters containing thermal sensor elements. From the above, it therefore follows that any number of thermal sensor elements can be employed in an array of thermal sensor elements, the thermal sensor elements sharing a sealed internal atmosphere and comprising one or more pressure sensor elements disposed about the array of thermal sensor elements in order to detect failure of the seal of the internal atmosphere. For example, the fifth sensor element 200 need not be provided with each cluster of sensor elements and one or a small number of fifth sensor elements 200, less that the number of clusters, can be distributed about the bonded bi-wafer structure to detect failure of the hermetic seal provided to maintain the common internal atmosphere of the gas under pressure.

Although, in the above examples, CMOS processing techniques are employed to form the thermal sensor elements and the pressure sensor element, the skilled person should appreciate that other processing techniques, for example MEMS processing techniques that advantageously provide the ability to apply a common processing technology to form both types of sensing elements at their relative sizes, can be employed.

What is claimed is:

1. A sealed sensor device comprising:

an internal atmosphere comprising a gas pressurised to a predetermined pressure, the predetermined pressure being below atmospheric pressure when the internal atmosphere is hermetically sealed from ambient;

a sensor cavity having a periphery and in fluid communication with the internal atmosphere, thereby comprising the gas and the gas having a mean free path at the predetermined pressure associated therewith;

a thermopile disposed in the sensor cavity configured to detect a change in pressure of the internal atmosphere and to detect failure of the hermetic seal;

a membrane structure disposed within the sensor cavity and comprising the thermopile; and a sensor pixel in fluid communication with the internal atmosphere and substantially insensitive to the pressure of the internal atmosphere;

wherein the membrane structure also comprises a heating element;

the sealed sensor device is hermetically sealed at wafer level, the internal atmosphere being formed and sealed at the wafer level; and a shortest distance from substantially any point on the membrane structure to the periphery of the sensor cavity is less than the mean free path of the gas at the predetermined pressure.

2. The device according to claim 1, wherein the sensor pixel comprises:

a sensor cavity, the sensor cavity comprising a getter material disposed therein.

3. The device according to claim 1, wherein the thermopile is blind to infrared radiation external to the cavity.

4. The device according to claim 1, further comprising: a blind measurement pixel, the blind measurement pixel being in fluid communication with the internal atmosphere and disposed adjacent the sensor pixel.

5. The device according to claim 1, wherein the thermopile, the membrane and the cavity constitute a pressure sensor pixel, the pressure sensor pixel having a responsivity associated therewith that is dominated by a thermal conductance of the gas.

6. The device according to claim 1, further comprising:

a measurement circuit operably coupled to the thermopile; wherein the measurement circuit is configured to calculate a first responsivity in respect of the internal atmosphere.

7. A method of detecting failure of a hermetic seal of a sealed pressure sensor device, the method comprising:

providing the pressure sensor device according to claim 1;

measuring a responsivity of the pressure sensor device; and determining whether the pressure of the internal atmosphere has increased and caused the responsivity to fall below a predetermined expected responsivity value.

8. A sealed sensor array comprising a plurality of measurement sensor pixels and the sealed sensor device according to claim 1.

9. The array according to claim 8, wherein the plurality of measurement pixels is in fluid communication with the internal atmosphere.

10. The device according to claim 1, wherein the sensor pixel is an infrared sensor pixel comprising a measurement cavity, a measurement membrane and a measurement thermopile disposed on the measurement membrane.

11. The device according to claim 10, wherein the sensor pixel further comprises a measurement heater element, the measurement heater element being configured to provide a heat output matched to a heat output of the heating element.

12. The device according to claim 10, further comprising:

a measurement circuit operably coupled to the thermopile; wherein the measurement circuit is configured to calculate a first responsivity in respect of the internal atmosphere.

13. The device according to claim 12, wherein the measurement circuit is operably coupled to the measurement thermopile and configured to calculate a second responsivity in respect of the internal atmosphere and to calculate a relative responsivity using the first and second responsivities.

14. A method of manufacturing a sealed pressure sensor device, the method comprising:

forming a sensor cavity having a periphery;

forming a membrane structure comprising a thermopile within the cavity;

forming a heating element adjacent a hot end of the thermopile structure;

backfilling the sealed pressure sensor device with a gas to a predetermined pressure below atmospheric pressure and hermetically sealing the pressure sensor device at wafer level, thereby providing an internal atmosphere also formed and sealed at wafer level;

configuring the thermopile to detect a change in pressure of the internal atmosphere and to detect failure of the hermetic seal; and forming a sensor pixel in fluid communication with the internal atmosphere and substantially insensitive to the pressure of the internal atmosphere;

wherein the sensor cavity is in fluid communication with the internal atmosphere, thereby comprising the gas and the gas having a mean free path at the predetermined pressure associated therewith; and a shortest distance from substantially any point on the membrane to the periphery of the cavity is less than the mean free path of the gas at the predetermined pressure.

* * * * *